(12) United States Patent
Sun et al.

(10) Patent No.: US 12,046,926 B2
(45) Date of Patent: Jul. 23, 2024

(54) WIRELESS CHARGING TRANSMITTER, WIRELESS CHARGING CONTROL METHOD, APPARATUS AND SYSTEM

(71) Applicant: BEIJING XIAOMI MOBILE SOFTWARE CO., LTD., Beijing (CN)

(72) Inventors: Changyu Sun, Beijing (CN); Hang Ren, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 408 days.

(21) Appl. No.: 17/462,792

(22) Filed: Aug. 31, 2021

(65) Prior Publication Data

US 2022/0302770 A1    Sep. 22, 2022

(30) Foreign Application Priority Data

Mar. 18, 2021  (CN) .......................... 202110292637.2

(51) Int. Cl.
| | |
|---|---|
| *H02J 7/00* | (2006.01) |
| *G05D 23/20* | (2006.01) |
| *H02J 50/00* | (2016.01) |
| *H02J 50/10* | (2016.01) |
| *H02J 50/80* | (2016.01) |

(52) U.S. Cl.
CPC .............. *H02J 50/80* (2016.02); *G05D 23/20* (2013.01); *H02J 7/0029* (2013.01); *H02J 7/00309* (2020.01); *H02J 7/007192* (2020.01); *H02J 7/007194* (2020.01); *H02J 50/00* (2016.02); *H02J 50/10* (2016.02)

(58) Field of Classification Search
CPC .. H02J 50/00; H02J 50/10; H02J 50/80; H02J 7/007192; H02J 7/007194; H02J 7/0029; H02J 7/00309; G05D 23/20
See application file for complete search history.

(56) References Cited

U.S. PATENT DOCUMENTS

2013/0278226 A1* 10/2013 Cong .................. G01J 5/07
                                                                  320/150
2016/0181849 A1*  6/2016 Govindaraj ........... H02J 7/0044
                                                                  320/108

(Continued)

FOREIGN PATENT DOCUMENTS

CN          110932415 A       3/2020

OTHER PUBLICATIONS

Extended European Search Report issued to EP Application No. 2119896.8 dated Mar. 17, 2022, (9p).

*Primary Examiner* — Richard Isla
*Assistant Examiner* — Johali A Torres Ruiz
(74) *Attorney, Agent, or Firm* — Arch & Lake LLP

(57) ABSTRACT

A wireless charging control method, includes: acquiring a temperature of a wireless charging transmitter and a temperature of a charging terminal; generating a temperature adjustment instruction based on the temperature of the wireless charging transmitter and the temperature of the charging terminal; and according to the temperature adjustment instruction, controlling the temperature adjustment component in the wireless charging transmitter to adjust temperatures, so that the temperature of the wireless charging transmitter and the temperature of the charging terminal are within a set temperature range.

8 Claims, 7 Drawing Sheets

(56) References Cited

U.S. PATENT DOCUMENTS

| | | | |
|---|---|---|---|
| 2016/0190850 A1* | 6/2016 | Jeganathan | H02J 7/00047 |
| | | | 320/108 |
| 2018/0160572 A1 | 6/2018 | Elias et al. | |
| 2018/0262043 A1* | 9/2018 | Yi | H04B 5/79 |
| 2019/0299790 A1* | 10/2019 | Smith | H01M 10/65 |
| 2019/0340916 A1* | 11/2019 | Graafsma | G08B 17/10 |
| 2020/0212515 A1* | 7/2020 | King | H02J 7/00034 |
| 2020/0244109 A1* | 7/2020 | Song | H04B 7/15507 |
| 2021/0267098 A1* | 8/2021 | Wippler | H02J 7/00309 |
| 2021/0297098 A1* | 9/2021 | Haque | H04B 1/10 |

* cited by examiner

WIRELESS CHARGING TRANSMITTER, WIRELESS CHARGING CONTROL METHOD, APPARATUS AND SYSTEM

CROSS REFERENCE

This application is based upon and claims priority to Chinese Patent Application No. 202110292637.2, filed on Mar. 18, 2021, the entire contents of which are incorporated herein by reference for all purposes.

TECHNICAL FIELD

The present disclosure relates to the field of terminal charging technology, and in particular to a wireless charging transmitter, a wireless charging control method, apparatus and system.

BACKGROUND

With the development of fast charging technology, the current charging power of smart phones and other terminals is getting higher and higher, and the charging speed is getting faster and faster.

Sometimes, the charging method of the terminal has been developed from a wired charging method to a wireless charging method. Whether it is a wired charging method or a wireless charging method, based on the principle that the greater the charging power, the faster the charging speed, the method of increasing the charging power and increasing the charging speed is usually adopted.

However, when the charging power is constant or the same, how to further increase the charging speed is a topic that needs to be studied.

SUMMARY

According to a first aspect of the examples of the present disclosure, there is provided a wireless charging transmitter. The wireless charging transmitter may include at least a first temperature collection component and a temperature adjustment component; wherein the first temperature collection component is configured to collect a temperature of the wireless charging transmitter; and the temperature adjustment component is configured to adjust, according to a temperature adjustment instruction of a control component, the temperature of the wireless charging transmitter and a temperature of a charging terminal to be within a set temperature range, wherein the temperature adjustment instruction is generated by the control component based on the temperature of the wireless charging transmitter and the temperature of the charging terminal, the control component is arranged at the wireless charging transmitter or the charging terminal, and the charging terminal is a terminal that receiving a charging signal transmitted by the wireless charging transmitter.

According to a second aspect of the examples of the present disclosure, there is provided a wireless charging control method. The wireless charging control method may include: acquiring a temperature of a wireless charging transmitter and a temperature of a charging terminal; generating a temperature adjustment instruction based on the temperature of the wireless charging transmitter and the temperature of the charging terminal; and according to the temperature adjustment instruction, controlling the temperature adjustment component in the wireless charging transmitter to adjust temperatures, so that the temperature of the wireless charging transmitter and the temperature of the charging terminal are within a set temperature range.

According to a third aspect of the examples of the present disclosure, there is provided a wireless charging control device. The wireless charging control device may include an acquisition module configured to acquire a temperature of a wireless charging transmitter and a temperature of a charging terminal; and a control module configured to generate a temperature adjustment instruction based on the temperature of the wireless charging transmitter and the temperature of the charging terminal, and according to the temperature adjustment instruction, control a temperature adjustment component in the wireless charging transmitter to adjust temperatures, so that the temperature of the wireless charging transmitter as well as the temperature of the charging terminal are within a set temperature range.

According to a fourth aspect of the examples of the present disclosure, there is provided a wireless charging control system. The wireless charging control system may comprise a charging terminal and a wireless charging transmitter, wherein the wireless charging transmitter comprises at least a first temperature collection component and a temperature adjustment component, and the charging terminal comprises at least a second temperature collection component, wherein the charging terminal or the wireless charging transmitter further comprises a control component; wherein the first temperature collection component is configured to collect a temperature of the wireless charging transmitter; the second temperature collection component is configured to collect a temperature of the charging terminal; the control component is configured to acquire the temperature of the wireless charging transmitting terminal collected by the first temperature collection component and the temperature of the charging terminal collected by the second temperature collecting component, generate a temperature adjustment instruction based on the temperature of the wireless charging transmitter and the temperature of the charging terminal, and send the temperature adjustment instruction to the temperature adjustment component; and the temperature adjustment component is configured to receive the temperature adjustment instruction sent by the control component, and adjust temperatures according to the temperature adjustment instruction, so that the temperature of the wireless charging transmitter and the temperature of the charging terminal are within a set temperature range.

According to a fifth aspect, there is provided a wireless charging control apparatus. The wireless charging control apparatus may include a processor; and a memory for storing instructions executable by the processor; wherein, the processor is configured to perform steps in the wireless charging control method described above.

According to a sixth aspect, there is provided a non-transitory computer-readable storage medium, wherein when the instructions in the storage medium are executed by a processor, steps of the wireless charging control method described above are implemented.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show examples consistent with the disclosure, and together with the specification are used to explain the principle of the disclosure.

DETAILED DESCRIPTION

The examples will be described in detail here, and examples thereof are shown in the accompanying drawings. When the following description refers to the drawings, unless otherwise indicated, the same numbers in different drawings indicate the same or similar elements. The implementation manners described in the following examples do not represent all implementation manners consistent with the present disclosure. Rather, they are merely examples of devices and methods consistent with some aspects of the present disclosure.

Wireless charging technology, also known as inductive charging and non-contact charging, is a new type of charging technology derived from wireless power transmission technology. The wireless charging technology uses near-field induction, and the wireless charging device and the charging terminal transfer energy through inductive coupling, without wire connection. The wireless charging device transmits energy to the charging terminal, and the charging terminal receives the energy to charge the terminal battery, so as to provide energy for the use of the terminal equipment.

With the development of fast charging technology, the charging power of smart phones and other terminals is getting higher and higher, and the charging speed is getting faster and faster. In the wired charging method or the wireless charging method, the greater the charging power, the faster the charging speed. In the current technology, the charging power is usually increased to increase the charging speed.

The charging process for a battery includes a constant current (CC) charging stage and a constant voltage (CV) charging stage. The closer the battery is to the full charge, the greater its internal resistance. When the temperature of the cell in the battery is low, the internal resistance is large and the charging speed is slow, and when the temperature of the cell in the battery is high, the internal resistance is small and the charging speed is fast. As the charging current gradually decreases during the charging process, the temperature rising phenomenon caused by the current weakens, and the temperature increased due to the charging gradually decreases to room temperature. As the temperature decreases, the internal resistance of the battery increases compared to that at high temperatures, resulting in a slower charging speed. The charging in the CV stage of the charging process is slow, which affects the overall charging speed of the battery.

Figure 1:
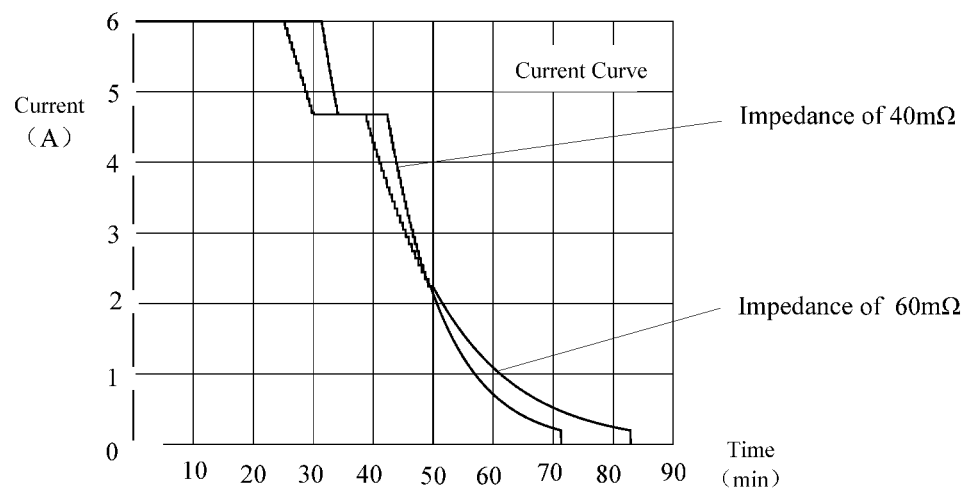
FIG. 1 is a schematic diagram showing a relationship between a battery current and charging time according to an example of the present disclosure.

FIG. 1 is a schematic diagram showing a relationship between a battery current and charging time according to an example of the present disclosure. FIG. 1 shows a comparison of charging speeds of impedances for internal resistances of different batteries when the charging power is the same. It can be seen that when the internal resistance of a battery is relatively small, the CC stage is long, the CV stage is short, and the charging speed of the battery is fast.

However, if the battery temperature is too high, the user will obviously feel that the terminal becomes hot, which is not conducive to the safety of the terminal and affects the service life of the terminal. In addition, the high temperature will trigger the terminal to limit the charging current, which will reduce the charging speed and prolong the charging time.

Therefore, the present disclosure provides a wireless charging control method. During the wireless charging of the terminal, the temperature is controlled within a set temperature range, so that the charging speed will not be too low, and the safety of use will not be affected by overheating.

Figure 2:
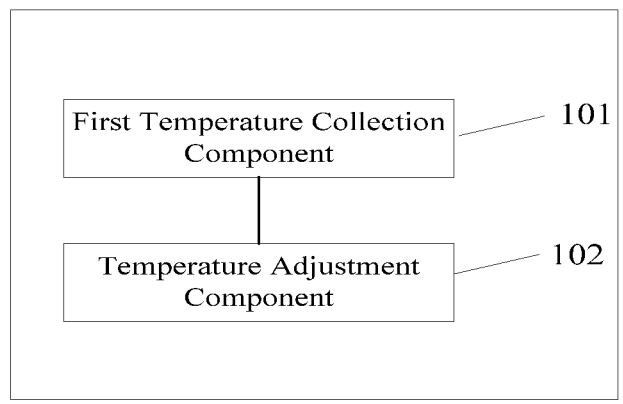
FIG. 2 is a block diagram showing a wireless charging transmitter according to an example of the present disclosure.

FIG. 2 is a block diagram of a wireless charging transmitter according to an example of the present disclosure. As shown in FIG. 2, the wireless charging transmitter 100 includes a first temperature collection component 101 and a temperature adjustment component 102.

The first temperature collection component 101 is configured to collect the temperature of the wireless charging transmitter 100.

The temperature adjustment component 102 is configured to, according to a temperature adjustment instruction of a control component, adjust a temperature of the wireless charging transmitter 100 and a temperature of a charging terminal into a set temperature range.

In the example of the present disclosure, the temperature adjustment instruction is generated by the control component based on the temperature of the wireless charging transmitter 100 and the temperature of the charging terminal. The control component is set at the wireless charging transmitter 100 or may be set at the charging terminal. The charging terminal is a terminal that receiving a charging signal transmitted by the wireless charging transmitter 100. The charging terminal includes a charging cell, and the wireless charging transmitter 100 can communicate with the charging cell of the charging terminal to realize charging of the charging terminal.

In the example of the present disclosure, the temperature adjustment component 102 is used to adjust temperatures of the wireless charging transmitter 100 and the charging terminal according to the temperature adjustment instruction of the control component, so that the temperatures of the wireless charging transmitter 100 and the charging terminal are within a set temperature range. It should be understood that the temperature of the wireless charging transmitter 100 is too low, which affects the charging speed and causes the charging time of the charging terminal to be prolonged. The temperature of the wireless charging transmitter 100 is too high, which increases the temperature of the charging terminal and affects the temperature experience of the user using the terminal. If the terminal temperature rises too high, it will trigger the terminal to limit the charging current, and the decrease of the charging current of the charging terminal will lead to a reduction of the charging speed. That is, the set temperature range is that the temperature is not too low and is not too high, i.e., the set temperature range should not be low enough to affect charging speed and should not be high enough to affect the user's experience of using the terminal, which makes the set temperature range take into account both the charging speed and the user's temperature experience.

Figure 3:
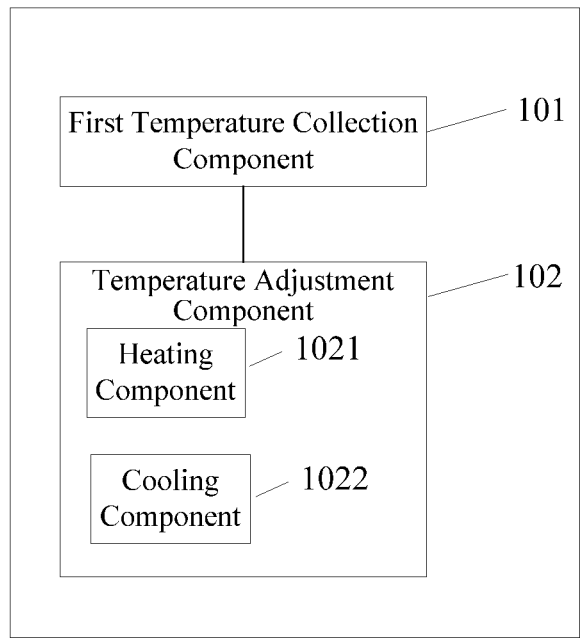
FIG. 3 is a block diagram showing a wireless charging transmitter according to another example of the present disclosure.

FIG. 3 is a block diagram of a wireless charging transmitter according to another example of the present disclosure. As shown in FIG. 3, the temperature adjustment component 102 of the wireless charging transmitter 100 includes a heating component 1021 and a cooling component 1022.

The temperature adjustment component 102 is used to adjust, according to the temperature adjustment instruction of the control component, the temperature of the wireless charging transmitter 100 and the temperature of the charging terminal, so that the temperature of the wireless charging transmitter 100 and the temperature of the charging terminal are within the set temperature range. The temperature adjustment component 102 includes the heating component 1021 and the cooling component 1022. The heating component 1021 may be an electric heating resistance wire or the like. The cooling component 1022 may be realized by a fan device based on air-cooling or realized by liquid cooling.

In an example, the first temperature collection component 101 includes a temperature sensor arranged at the wireless charging transmitter 100. It is understandable that there may be one or more temperature sensors, and the temperature sensor provided at the wireless charging transmitter 100 collects the temperature of the wireless charging transmitter 100.

Figure 4:
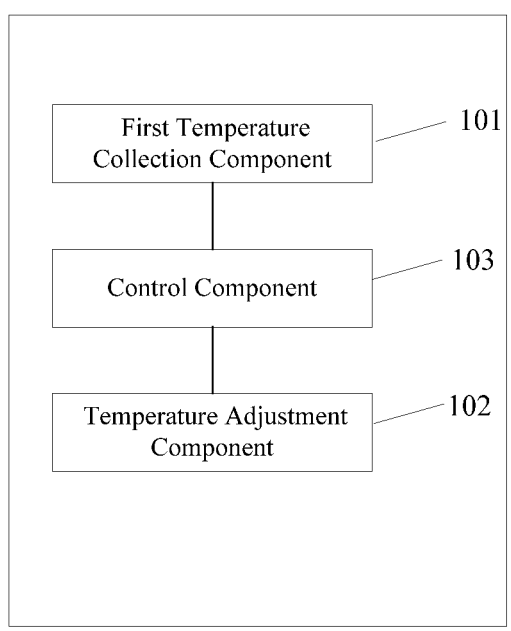
FIG. 4 is a block diagram showing a wireless charging transmitter according to another example of the present disclosure.

FIG. 4 is a block diagram showing a wireless charging transmitter according to another example of the present disclosure. As shown in FIG. 4, the wireless charging transmitter 100 further includes a control component 103.

When the control component 103 is set at the wireless charging transmitter 100, it obtains the temperature of the wireless charging transmitter 100 and the temperature of the charging terminal, and obtains a fitted temperature based on the temperature of the wireless charging transmitter 100 and the temperature of the charging terminal, and controls the temperature adjustment component 102 to adjust temperatures of the wireless charging transmitter 100 and the charging terminal, so that the fitted temperature is within the set temperature range.

In the example of the present disclosure, the control component 103 obtains the fitted temperature based on the acquired temperature of the wireless charging transmitter 100 and the acquired cell temperature of the charging terminal, and based on the temperature of the wireless charging transmitter 100 and the temperature of the charging terminal. The control component 103 generates the temperature adjustment instruction, and controls the temperature adjustment component 102 to adjust temperatures, so that the fitted temperature is within the set temperature range, thus realizing the temperature control during the wireless charging of the charging terminal.

It should be understood that the control component 103 can be provided at the charging terminal, or can be provided at the wireless charging transmitter 100. When the control component is provided at the charging terminal, the charging terminal performs wireless communication with the wireless charging transmitter 100, and sends the temperature adjustment instruction to the wireless charging transmitter 100. The temperature adjustment component 102 adjusts the temperature based on the received temperature adjustment instruction, and adjusts the temperature of the wireless charging transmitter 100 to be within the set temperature range.

In another example of the present disclosure, the temperature adjustment instruction may also be generated by the control component 103 based on an ambient temperature monitored by an ambient temperature monitoring component. The ambient temperature monitoring component may be provided at the wireless charging transmitter 100 or at the charging terminal.

Figure 5:
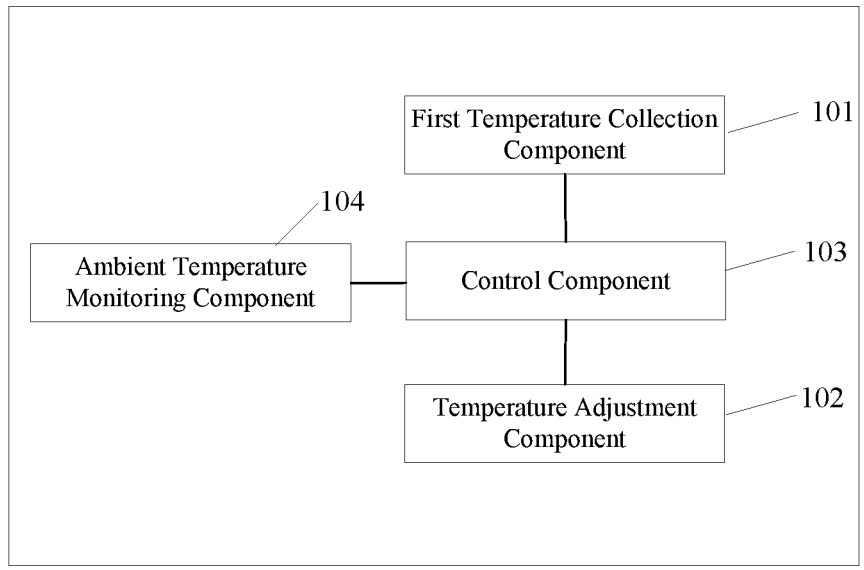
FIG. 5 is a flowchart showing a wireless charging control method according to an example of the present disclosure.

FIG. 5 is a block diagram of a wireless charging transmitter according to another example of the present disclosure. As shown in FIG. 5, the wireless charging transmitter 100 further includes an ambient temperature monitoring component 104.

In the example of the present disclosure, the ambient temperature monitoring component 104 may be provided at the wireless charging transmitter 100 or at the charging terminal. FIG. 5 shows that when the ambient temperature monitoring component 104 is set at the wireless charging transmitter 100, the ambient temperature is monitored. Based on the ambient temperature monitored by the ambient temperature monitoring component 104, the control component 103 controls the temperature adjustment component 102 to generate the temperature adjustment instruction, so as to adjust the temperature of the wireless charging transmitter and the temperature the charging terminal to be within the set temperature range.

It should be understood that when the ambient temperature monitoring component is set in the charging terminal, the charging terminal can wirelessly communicate with the wireless charging transmitter, and send the ambient temperature to the control component 103. The control component 103 generates the temperature adjustment instruction, and controls the temperature adjustment component 102 to adjust the temperature of the wireless charging transmitter and the temperature of the charging terminal to be within a set temperature range.

In the examples of the present disclosure, during the wireless charging process of the charging terminal, a temperature adjustment instruction is generated based on the ambient temperature, and the temperature adjustment component adjusts the temperature of the wireless charging transmitter and the temperature of the charging terminal to be within the set temperature range, so that the terminal is wirelessly charged at the charging speed, while ensuring the safety of the terminal.

Figure 6:
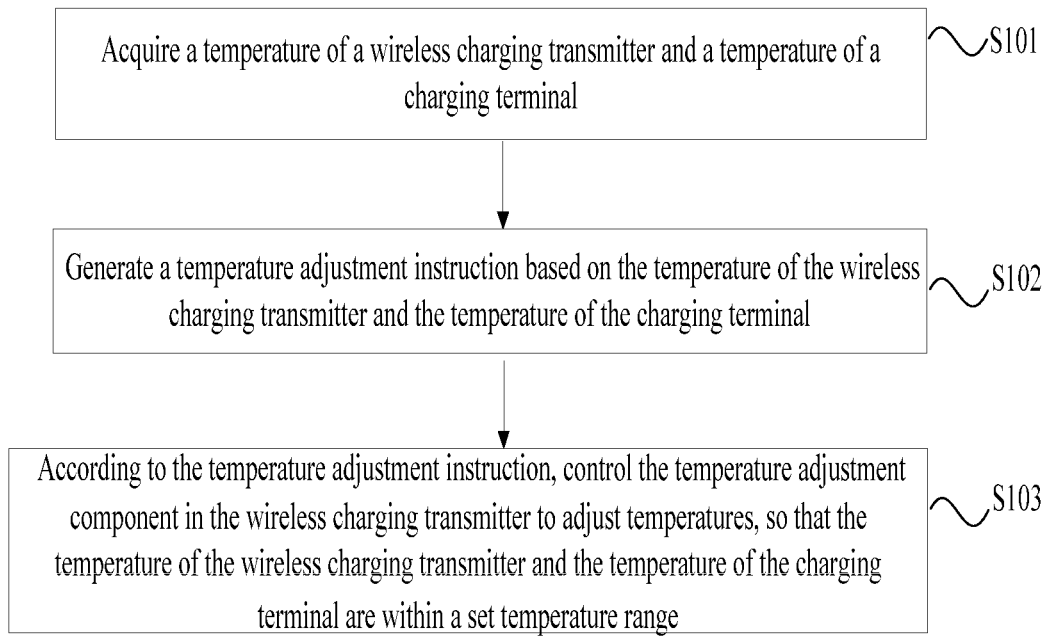
FIG. 6 is a flowchart showing a wireless charging control method according to another example of the present disclosure.

FIG. 6 is a flowchart showing a wireless charging control method according to an example of the present disclosure. As shown in FIG. 6, the wireless charging control method includes the following steps.

In step S101, a temperature of a wireless charging transmitter and a temperature of a charging terminal are acquired.

In step S102, a temperature adjustment instruction is generated based on the temperature of the wireless charging transmitter and the temperature of the charging terminal.

In step S103, according to the temperature adjustment instruction, a temperature adjustment component in the wireless charging transmitter is controlled to adjust temperatures, so that the temperature of the wireless charging transmitter and the temperature of the charging terminal are within a set temperature range.

In the example of the present disclosure, the charging terminal is a terminal that receives a charging signal transmitted by the wireless charging transmitter 100. The charging terminal includes a charging cell, and the wireless charging transmitter can communicate with the charging cell to charge the charging terminal. During the wireless charging process of the charging terminal, the temperature of the wireless charging transmitter is obtained, and the temperature of the charging terminal is obtained. Based on the temperature of the wireless charging transmitter and the temperature of the charging terminal, the temperature adjustment instruction is generated. According to the temperature adjustment instruction, the temperature adjustment component in the wireless charging transmitter is controlled to adjust temperatures, so that the temperature of the wireless charging transmitter and the temperature of the charging terminal are within the set temperature range. It should be understood that, during the wireless charging process, the temperature of the charging terminal is too low, which affects the charging speed and causes the charging time to be prolonged. The temperature of the charging terminal is too high, and the user obviously feels that the temperature of the terminal is too high, or even hot, which affects the user's temperature experience when using the terminal. Furthermore, if the terminal temperature rises too high, it will trigger the terminal to limit the charging current and reduce the charging current of the charging terminal, which results in a decrease in charging speed. For example, during the wireless charging process of the charging terminal, the set temperature range is 35° C. to 40° C. If it is determined that the temperature of the wireless charging transmitter and the temperature of the charging terminal exceed the set temperature range, for example, the temperature of the wireless charging transmitter and the temperature of the charging terminal are lower than 35° C., or higher than 40° C., the temperature adjustment instruction is generated to control the temperature adjustment component in the wireless charging transmitter to adjust temperatures, i.e., to increase or decrease the temperature, so that the adjusted temperatures of the wireless charging transmitter and charging terminal are within the set range of 35° C. to 40° C. It should be understood that, in the case the temperature adjustment instruction is generated based on the temperature of the wireless charging transmitter and the temperature of the charging terminal, when the adjustment instruction is generated, it may be that the temperatures of both wireless charging transmitter and charging terminal are not in the set temperature range, or the temperature of any one of them is not in the set temperature range, i.e., out of the set temperature range, which needs adjustments to the temperature.

According to the examples of the present disclosure, a temperature adjustment instruction is generated based on the temperature of the wireless charging transmitter and the temperature of the charging terminal, and according to the temperature adjustment instruction of the control component, the temperature adjustment component adjusts the temperature of the wireless charging transmitter and the temperature of the charging terminal to be in a set temperature range, which ensures the charging speed of the charging terminal while ensuring the safe use of the charging terminal and improves the temperature experience of the user during the charging process.

Figure 7:
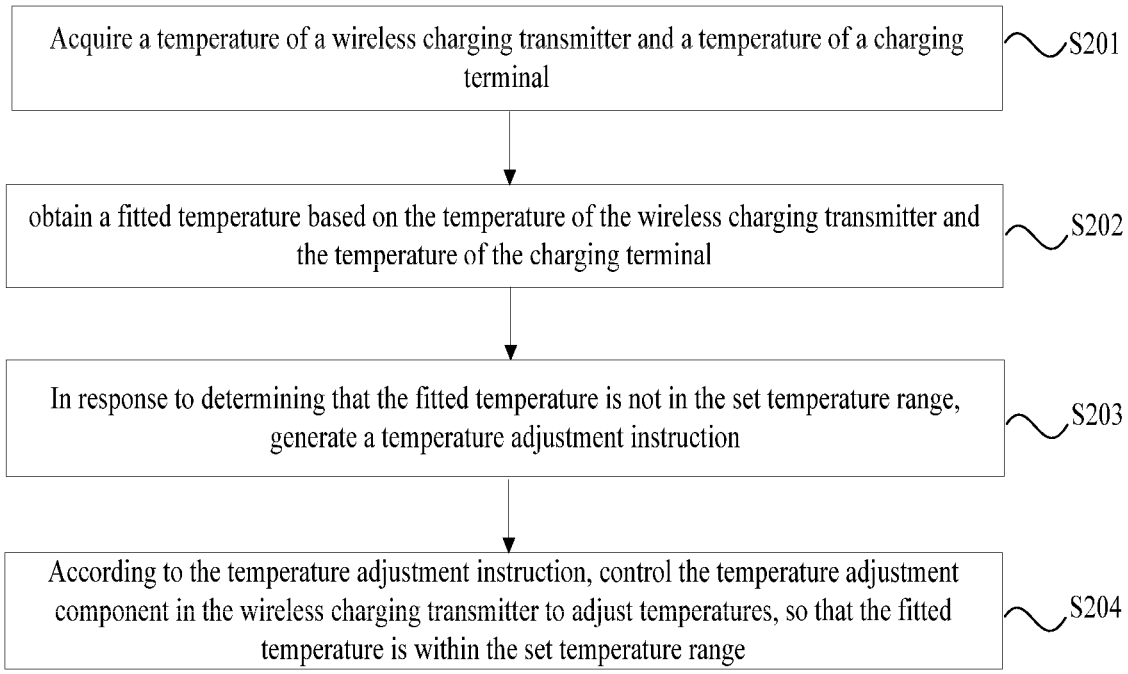
FIG. 7 is a flowchart showing a method for determining that a temperature exceeds a set temperature range according to an example of the present disclosure.

FIG. 7 is a flowchart showing a wireless charging control method according to another example of the present disclosure. As shown in FIG. 7, the wireless charging control method includes the following steps.

In step S201, a temperature of a wireless charging transmitter and a temperature of a charging terminal are acquired.

In step S202, a fitted temperature is acquired based on the temperature of the wireless charging transmitter and the temperature of the charging terminal.

In step S203, if it is determined that the fitted temperature exceeds a set temperature range, a temperature adjustment instruction is generated.

In step S204, according to the temperature adjustment instruction, the temperature adjustment component in the wireless charging transmitter is controlled to adjust temperatures, so that the fitted temperature is within the set temperature range.

In the example of the present disclosure, the charging terminal is a terminal that receives a charging signal transmitted by the wireless charging transmitter 100. The charging terminal includes a charging cell, and the wireless charging transmitter can communicate with the charging cell to charge the charging terminal. The temperature of the wireless charging transmitter is obtained and the temperature of the charging terminal is obtained. The fitted temperature is obtained based on the temperature of the wireless charging transmitter and the temperature of the charging terminal and can comprehensively reflect the temperature conditions of the wireless charging transmitter and the charging terminal. If it is determined that the fitted temperature is not in the set temperature range, a temperature adjustment instruction is generated. According to the temperature adjustment instruction, the temperature adjustment component in the wireless charging transmitter is controlled to adjust temperatures, so that the fitted temperature is within the set temperature range.

According to the examples of the present disclosure, based on the fitted temperature of the temperatures of the wireless charging transmitter and the charging terminal, if it is determined that the fitted temperature is not in the set temperature range, or out of the set temperature range, the temperature adjustment component in the wireless charging transmitter is controlled to adjust temperatures to make the fitted temperature is within the set temperature range, so as to ensure the wireless charging speed of the charging terminal, while ensuring the safety of the charging terminal, and improve the temperature experience of the user during use.

Figure 8:
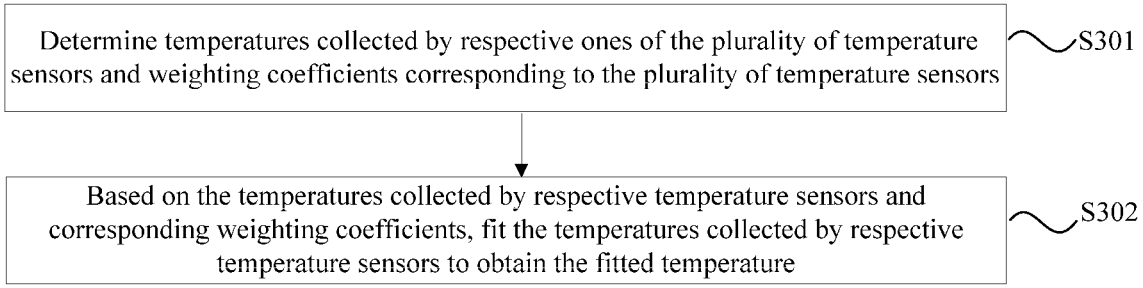
FIG. 8 is a flowchart showing a method for obtaining a fitted temperature according to an example of the present disclosure.

FIG. 8 is a flowchart showing a method for obtaining a fitted temperature according to an example of the present disclosure. As shown in FIG. 8, the method for obtaining the fitted temperature includes the following steps.

In step S301, temperatures collected by respective ones of the multiple temperature sensors and weighting coefficients corresponding to the multiple temperature sensors are determined.

In step S302, based on the temperatures collected by respective temperature sensors and corresponding weighting coefficients, the temperatures collected by respective ones in the multiple temperature sensors are fitted to obtain the fitted temperature.

In the example of the present disclosure, during the wireless charging process of the terminal, the temperature of the wireless charging transmitter is obtained, and the temperature of the charging terminal is obtained. If the temperature of the wireless charging transmitter and/or the temperature of the charging terminal are collected by multiple temperature sensors, the multiple temperature sensors separately collect the temperature of the wireless charging transmitter and the temperature of the charging terminal. The fitted temperature is obtained or fitted based on the temperature of the wireless charging transmitter terminal and the temperature of the charging terminal collected by each of the multiple temperature sensors.

When determining the fitted temperature, a weighted sum method can be used, that is, the temperatures respectively collected from multiple temperature sensors and the corresponding weighting coefficients of multiple temperature sensors are determined, and the temperatures of the temperature sensors are respectively multiplied by the corresponding weighting coefficients, and the resulted products from the multiplications are summed up get the fitted temperature.

For example, the temperature of the wireless charging transmitter and the temperature of the charging terminal are collected by n temperature sensors respectively set at the wireless charging transmitter of the wireless charging device and the charging terminal. The measured temperatures of the n temperature sensors are $T_1, T_2, \ldots, T_n$. The n weighting coefficients corresponding to the measured temperatures are $\alpha_1, \alpha_2, \ldots, \alpha_n$, and the fitted temperature T is:

$$T = T_1 \times \alpha_1 + T_2 \times \alpha_2 + \ldots T_n \times \alpha_n.$$

In the example of the present disclosure, the weighting coefficients corresponding to the n temperature sensors are $\alpha_1, \alpha_2, \ldots, \alpha_n$, which can be determined based on the use needs of the terminal or the experience. It can also be determined by performing a deep learning of the use scene through n temperature sensors and using a deep learning method. It can also be determined in other ways, which is not limited in the examples of the present disclosure. After getting the fitted temperature, making a comparison between the fitted temperature and the set temperature range. If the fitted temperature is higher than a maximum temperature of the set temperature range, the cooling component is controlled to cool; and if the fitted temperature is lower than a minimum temperature of the temperature range, the heating component is controlled to heat, so that the fitted temperature is within the set temperature range.

According to the examples of the present disclosure, the temperature of the wireless charging transmitter terminal and/or the temperature of the charging terminal are collected by multiple temperature sensors, and the respective temperatures collected by the multiple temperature sensors and the respective weighting coefficients of the multiple temperature sensors are respectively obtained. Fitting the temperatures collected by multiple temperature sensors can obtain a more accurate fitted temperature and provide a guarantee for the charging effect of the charging terminal.

Figure 9:
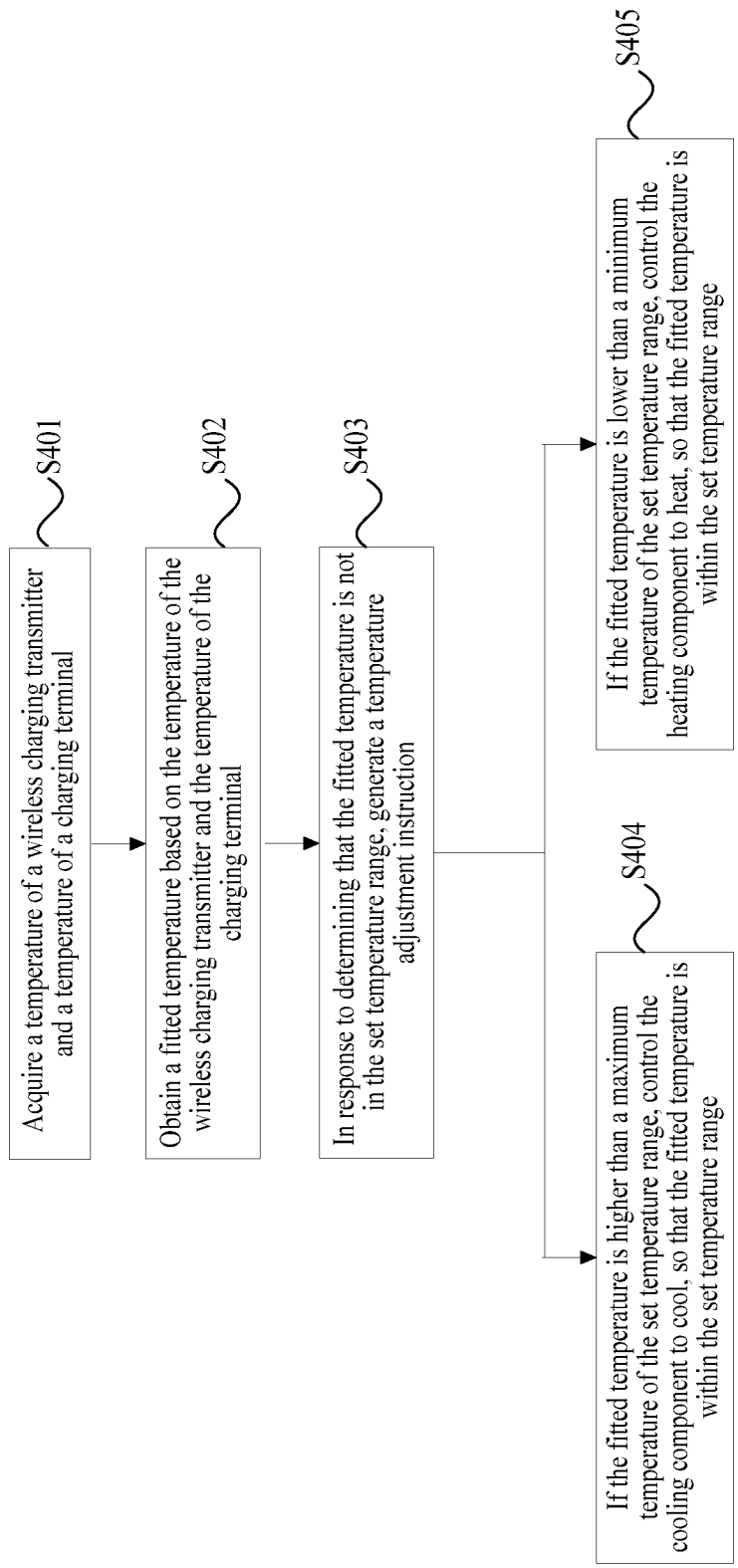
FIG. 9 is a flowchart showing a wireless charging control method according to another example of the present disclosure.

FIG. 9 is a flowchart showing a wireless charging control method according to another example of the present disclosure. As shown in FIG. 9, the wireless charging control method includes the following steps.

In step S401, a temperature of a wireless charging transmitter and a temperature of a charging terminal are acquired.

In step S402, a fitted temperature is obtained based on the temperature of the wireless charging transmitter and the temperature of the charging terminal.

In step S403, if it is determined that the fitted temperature is not within a set temperature range, a temperature adjustment instruction is generated.

In step S404, if the fitted temperature is higher than a maximum temperature of the set temperature range, a cooling component is controlled to cool to make the fitted temperature to be within the set temperature range.

In step S405, if the fitted temperature is lower than a minimum temperature of the set temperature range, a heating component is controlled to heat to make the fitted temperature to be within the set temperature range.

In the example of the present disclosure, during the wireless charging process of the terminal, the temperature of the wireless charging transmitter is acquired, and the temperature of the charging terminal is acquired. The fitted temperature is obtained based on the temperature of the wireless charging transmitter and the temperature of the charging terminal, and the fitted temperature can comprehensively reflect the temperature conditions of the wireless charging transmitter and the charging terminal. If the fitted temperature of the wireless charging transmitter and the charging terminal is higher than the maximum temperature of the set temperature range, an instruction to lower the temperature is generated to control the cooling component to cool. If the fitted temperature of the wireless charging transmitter and the charging terminal is lower than the minimum temperature of the set temperature range, an instruction to increase the temperature is generated to control the heating component to heat, so as to increase the temperature, that is, the fitted temperature can be within the set temperature range by increasing the temperature.

For example, during the wireless charging process of the terminal, the set temperature range is 35° C. to 40° C. If it is determined that the fitted temperature of the wireless charging transmitter and the charging terminal is 50° C., it is higher than the highest temperature of 40° C. in the set temperature range, the cooling component is controlled to cool to reduce the temperature, so that the fitted temperature is within the range of 35° C. to 40° C. If the fitted temperature of the wireless charging transmitter and the charging terminal is 20° C., which is lower than the lowest temperature of 35° C. in the set temperature range, the heating component is controlled to heat to increase the temperature, so that the fitted temperature is between 35° C. and 40° C.

According to the example of the present disclosure, the fitted temperature of the wireless charging transmitter and the charging terminal is determined. If the fitted temperature is higher than the maximum temperature of the set temperature range, the cooling component is controlled to cool, and if the fitted temperature is lower than the minimum temperature of the set temperature range, the heating component is controlled to heat, so that the fitted temperature can be within the set temperature range to ensure the wireless charging speed of the charging terminal while ensuring the safety of the terminal.

In an example of the present disclosure, the ambient temperature monitored by the ambient temperature monitoring component is acquired, and a temperature range about the ambient temperature is determined, and the heating component and the cooling component are controlled differently according to different temperature ranges. The ambient temperature monitoring component can be set at the wireless charging transmitter or at the charging terminal.

In the example of the present disclosure, a highest temperature of a first temperature range is less than a first temperature threshold. If the ambient temperature is within the first temperature range, the heating component is controlled to heat during the entire wireless charging stage so that the fitted temperature is within the set temperature range. If the ambient temperature is within a second temperature range, control the cooling component to cool during the constant current (CC) charging stage of wireless charging, and control the heating component to heat during the constant voltage (CV) charging stage of wireless charging, so that the fitted temperature is within the set temperature range. If the ambient temperature is within a third temperature range, the cooling component is controlled to cool during the entire wireless charging phase, so that the fitted temperature is within the set temperature range.

The first temperature threshold is smaller than a second temperature threshold, and based on the first temperature threshold and the second temperature threshold, the ambient temperature is divided into the first temperature range, a second temperature range, and a third temperature range. The lowest temperature of the third temperature range is higher than the second temperature threshold, the first temperature threshold is less than the lowest temperature of the second temperature range, and the second temperature threshold is greater than the highest temperature of the second temperature range.

It should be understood that, the first temperature range corresponds to a use scenario of low-temperature charging of the charging terminal, the second temperature range corresponds to a use scenario of normal-temperature charging of the charging terminal, and the third temperature range corresponds to a use scenario of high-temperature charging of the charging terminal. If the ambient temperature is in a low-temperature charging scenario, the heating component is controlled to heat during the entire wireless charging phase to ensure that low-temperature charging reaches the same charging speed as the normal-temperature charging, that is, in the low-temperature charging scenario, the charging terminal reaches the same charging speed as the normal-temperature charging.

If the ambient temperature is in a normal-temperature charging scenario, in a normal-temperature environment, as the charging process progresses, the battery core of the charging terminal heats up, which results in the temperature is higher than the maximum temperature of the set temperature range, so the cooling component is controlled to cool during the CC charging stage of wireless charging, and the heating component is controlled to heat during the CV charging stage of the wireless charging, which effectively improves the slow charging caused by the decrease of the temperature and the increase of the internal resistance of the battery during the CV stage in the normal temperature charging.

If the ambient temperature is in a high-temperature charging scenario, the cooling component is controlled to cool during the entire wireless charging stage to ensure that in the high-temperature charging scenario, the charging terminal reaches the same charging speed as the normal-temperature charging.

According to the example of the present disclosure, the ambient temperature is acquired, and different temperature control methods are used for the high temperature charging scenario, the low temperature charging scenario, and the normal temperature charging scenario, respectively, so that the temperatures of the wireless charging transmitter and the charging terminal are within the set temperature range, to ensure the charging speed of wireless charging in different temperature charging scenarios.

Figure 10:
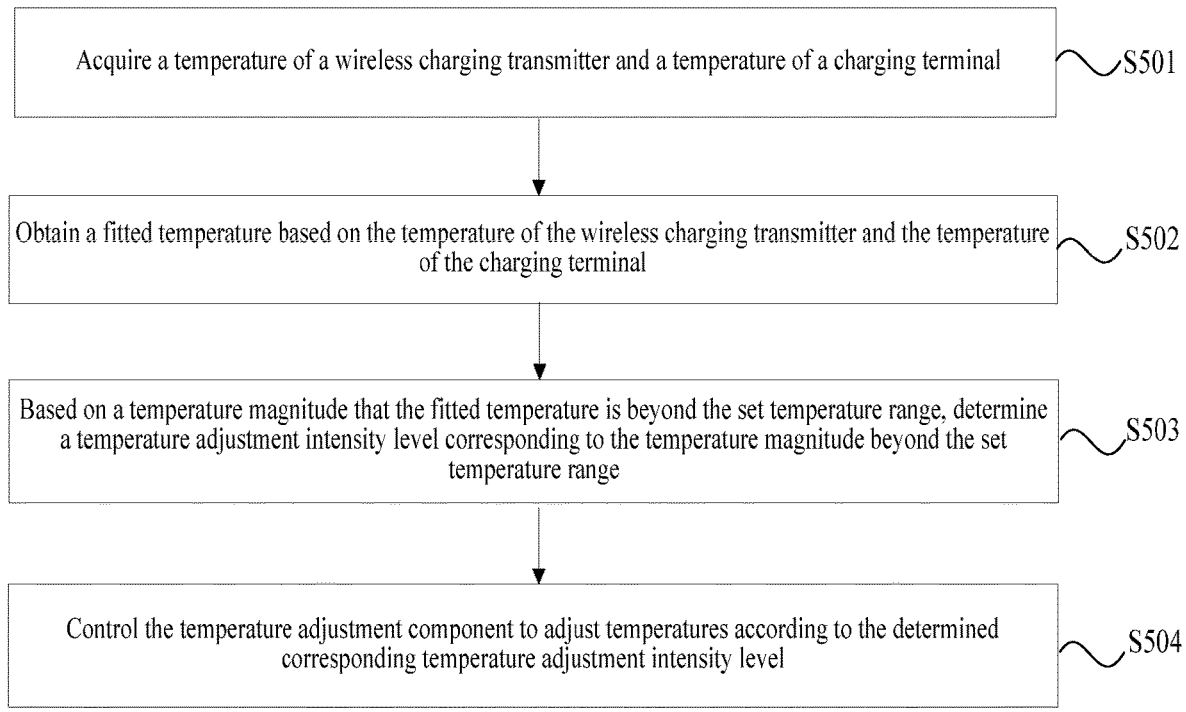
FIG. 10 is a flowchart showing a wireless charging control method according to another example of the present disclosure.

In an example of the present disclosure, the temperature adjustment component has different temperature adjustment intensity levels, and different temperature adjustment intensity levels correspond to different temperature adjustment intensities. FIG. 10 is a flowchart showing a wireless charging control method according to another example of the present disclosure. As shown in FIG. 10, the wireless charging control method includes the following steps.

In step S501, a temperature of a wireless charging transmitter and a temperature of a charging terminal are acquired.

In step S502, a fitted temperature is obtained based on the temperature of the wireless charging transmitter and the temperature of the charging terminal.

In step S503, based on a temperature magnitude that the fitted temperature is beyond a set temperature range, a temperature adjustment intensity level corresponding to the temperature magnitude beyond the set temperature range is determined.

In step S504, a temperature adjustment component is controlled to adjust temperatures according to the determined temperature adjustment intensity level.

In the example of the present disclosure, during the wireless charging process of the terminal, the temperature of the wireless charging transmitter and the temperature of the charging terminal are acquired, and the temperature of the wireless charging transmitter and the temperature of the charging terminal are fitted to obtain the fitted temperature. If it is determined that the fitted temperature is not within the set temperature range, based on the temperature magnitude that the fitted temperature is beyond the set temperature range, the temperature adjustment intensity level corresponding to the temperature magnitude beyond the set temperature range is determined. When the temperature adjustment component adjusts the temperature, it is adjusted according to the temperature adjustment intensity level corresponding to the temperature magnitude beyond the set temperature range.

The temperature adjustment component has different temperature adjustment intensity levels. When the temperature is adjusted, different temperature magnitudes that the fitted temperature is beyond the set temperature range may correspond to differences adjustment intensity levels. The temperature adjustment intensity level corresponding to temperature magnitude beyond the set temperature range is determined, and the temperature adjustment component is controlled to adjust temperatures according to the corresponding adjustment intensity level. For example, the temperature adjustment intensity level is set to three levels: strong, medium, and weak. When the temperature magnitude that the fitted temperature is beyond the set temperature range is large, the temperature adjustment intensity level is set to strong, that is, the adjustment with greater intensity is performed to achieve a faster temperature adjustment speed. When the temperature magnitude that the fitted temperature is beyond the set temperature range is small, the temperature adjustment intensity level is set to weak, that is, the adjustment with less adjustment intensity is performed to meet the need of the temperature adjustment and save energy. The temperature adjustment intensity level can also be set to multiple levels to improve the accuracy of temperature adjustment.

According to the example of the present disclosure, when the fitted temperature is not in the set temperature range, and the temperature adjustment component is controlled to adjust temperatures according to the corresponding temperature adjustment intensity level determined by the temperature magnitude beyond the set temperature range, which makes the temperature adjustment accurate, quick and effective.

Figure 11:
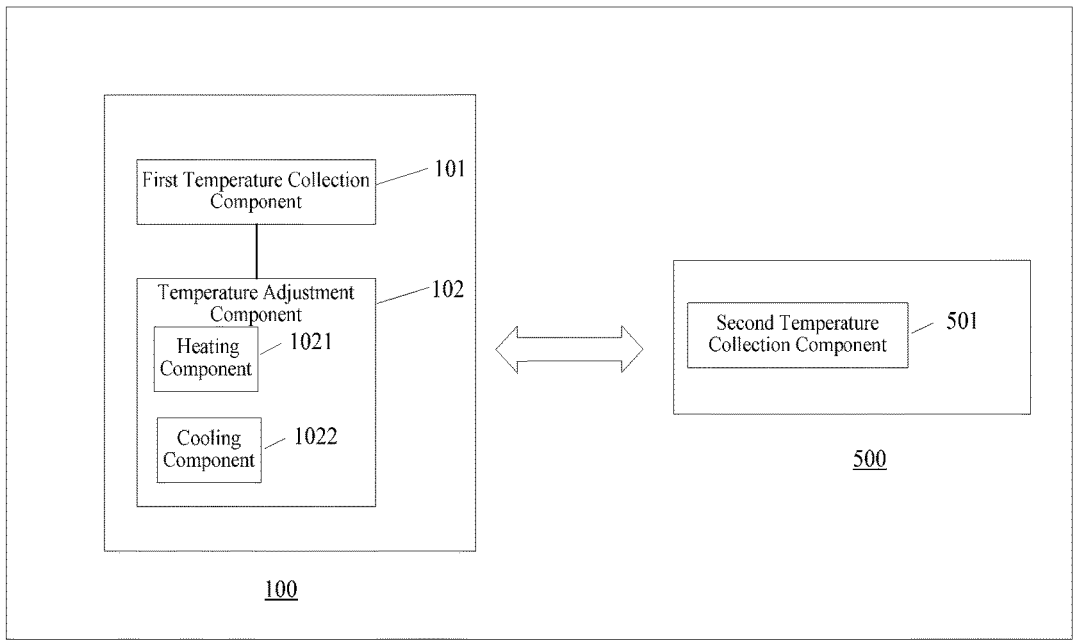
FIG. 11 is a block diagram showing a wireless charging control system according to an example of the present disclosure.

FIG. 11 is a block diagram showing a wireless charging control system according to an example of the present disclosure. As shown in FIG. 11, the wireless charging control system 1000 includes a wireless charging transmitter 100 and a charging terminal 500.

The wireless charging transmitter 100 at least includes a first temperature collection component 101 and a temperature adjustment component 102.

The charging terminal 500 includes at least a second temperature collection component 501. A control component is included in the wireless charging transmitter 100 or the charging terminal 500.

The first temperature collection component 101 is used to collect a temperature of the wireless charging transmitter 100.

The second temperature collection component 501 is used to collect a temperature of the charging terminal 500.

The control component (not shown) is used to acquire the temperature of the wireless charging transmitter 100 collected by the first temperature collection component 101 and the temperature of the charging terminal 500 collected by the second temperature collection component 501, and is used to, based on the temperature of the wireless charging transmitter 100 and the temperature of the charging terminal 500, generate a temperature adjustment instruction, and send the temperature adjustment instruction to the temperature adjustment component 102.

The temperature adjustment component 102 is configured to receive the temperature adjustment instruction sent by the control component, and adjust temperatures according to the temperature adjustment instruction, so that the temperature of the wireless charging transmitter 100 and the temperature of the charging terminal 500 are within a set temperature range.

In one example, the control component is specifically configured to obtain a fitted temperature based on the temperature of the wireless charging transmitter 100 and the temperature of the charging terminal 500, and generate a temperature adjustment instruction according to the fitted temperature, so as to control the temperature adjustment component 102 based on the temperature adjustment instruction to adjust temperatures, such that the fitted temperature is within the set temperature range.

In one example, the temperature adjustment component 102 includes a heating component 1021 and a cooling component 1022, and the temperature adjustment component 102 activates the heating component 1021 or the cooling component 1022 according to the temperature adjustment instruction, so that the temperature of the wireless charging transmitter 100 and the temperature of the charging terminal 500 are within the set temperature range.

In the example of the present disclosure, the wireless charging control system 1000 includes the wireless charging transmitter 100 and the charging terminal 500. The charging terminal 500 includes a charging cell. The wireless charging transmitter 100 can communicate with the charging cell of the charging terminal 500 to achieve the charging of the charging terminal 500. The first temperature collection component 101 collects the temperature of the wireless charging transmitter 100, and the second temperature collection component 501 collects the temperature of the charging terminal 500. The control component may be provided at the wireless charging transmitter 100 or at the charging terminal 500. The control component obtains the temperature of the wireless charging transmitter 100 and the temperature of the charging terminal 500. The control component performs fitting based on the temperature of the wireless charging transmitter 100 and the temperature of the charging terminal 500 to obtain a fitted temperature, generates a temperature adjustment instruction according to the fitted temperature, and then sends the temperature adjustment instruction to the temperature adjustment component 102. The temperature adjustment component 102 includes a heating component and a cooling component, and can heat or cool the wireless charging transmitter 100. The temperature adjustment component 102 receives the temperature adjustment instruction sent by the control component, and activates the heating component or the cooling component according to the temperature adjustment instruction, so that the temperature of the wireless charging transmitter 100 and the temperature of the charging terminal 500 are within a set temperature range.

According to the examples of the present disclosure, based on the temperature of the wireless charging transmitter and the temperature of the charging terminal, the temperature adjustment instruction is generated, and the temperature adjustment component adjusts, according to the temperature adjustment instruction of the control component, the temperature of the wireless charging transmitter and the temperature of the charging terminal to be within the set temperature range, which ensures the safe use of the charging terminal while ensuring the charging speed of the charging terminal, and improves the temperature experience of the user during the charging process.

Based on the same concept, the examples of the present disclosure also provide a wireless charging control apparatus.

It can be understood that, in order to realize the above-mentioned functions, the wireless charging control apparatus provided by the examples of the present disclosure includes hardware structures and/or software modules corresponding to each function. In combination with the units and algorithm steps of the examples disclosed in the examples of the present disclosure, the examples of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the examples of the present disclosure.

Figure 12:
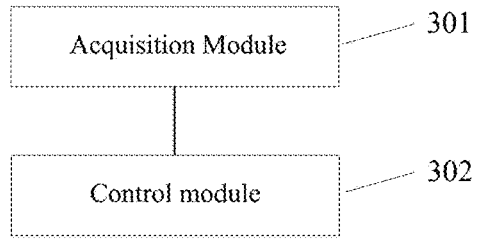
FIG. 12 is a block diagram showing a wireless charging control device according to an example of the present disclosure.

FIG. 12 is a block diagram showing a wireless charging control device according to an example of the present disclosure. Referring to FIG. 12, the wireless charging control device 300 includes an acquisition module 301 and a control module 302. The wireless charging control device 300 may be the control component 103 in the above-mentioned example.

The acquisition module 301 is used to acquire a temperature of a wireless charging transmitter and a temperature of a charging terminal.

The control module 302 is configured to generate a temperature adjustment instruction based on the temperature of the wireless charging transmitter and the temperature of the charging terminal, and according to the temperature adjustment instruction, control the temperature adjustment component in the wireless charging transmitter to adjust temperatures, so that the temperature of the wireless charging transmitter as well as the temperature of the charging terminal are within a set temperature range.

In one example, the control module 302 generates the temperature adjustment instruction based on the temperature of the wireless charging transmitter and the temperature of the charging terminal in the following manner: obtaining a fitted temperature based on the temperature of the wireless charging transmitter and the temperature of the charging terminal; in response to the determined fitted temperature is not within a set temperature range, generating a temperature adjustment instruction, and then the control module 302 uses the following method to control the temperature adjustment component in the wireless charging transmitter to adjust temperatures according to the temperature adjustment instruction, so that the temperature of the wireless charging transmitter and the temperature of the charging terminal are within a set temperature range: according to the temperature adjustment instruction, controlling the temperature adjustment component in the wireless charging transmitter to adjust temperatures, to make the fitted temperature to be within the set temperature range.

In one example, the control module 302 obtains the fitted temperature based on the temperature of the wireless charging transmitter and the temperature of the charging terminal in the following manner: when the temperature of the wireless charging transmitter and/or the temperature of the charging terminal are collected by multiple temperature sensors, determining temperatures collected by multiple temperature sensors, respectively, and corresponding weighting coefficients of multiple temperature sensors; based on the temperatures collected by multiple temperature sensors and the corresponding weighting coefficients, fitting the temperatures collected by multiple temperature sensors to obtain the fitted temperature.

In one example, the temperature adjustment component includes a heating component and a cooling component. The control module 302 controls the temperature adjustment component in the wireless charging transmitter to adjust temperatures according to the temperature adjustment instruction in the following manner: if the fitted temperature is higher than a maximum temperature of the set temperature range, the cooling component is controlled to cool; if the fitted temperature is lower than a minimum temperature of the set temperature range, the heating component is controlled to heat.

In an example, the acquisition module 301 is further configured to acquire an ambient temperature monitored by an ambient temperature monitoring component.

The control module 302 is further configured to: when the ambient temperature is within a first temperature range, control the heating component to heat during the entire wireless charging process, so that the fitted temperature is within the set temperature range; when the ambient temperature is within a second temperature range, control the cooling component to cool during the constant current charging stage of wireless charging, and control the heating component to heat during the constant voltage charging stage of wireless charging, so that the fitted temperature is within the set temperature range; when the ambient temperature is within a third temperature range, control the cooling component to cool during the entire wireless charging process, so that the fitted temperature in within the set temperature range; wherein a highest temperature of the first temperature range is less than a first temperature threshold, a lowest temperature of the third temperature range is higher than a second temperature threshold; the first temperature threshold is less than the lowest temperature of the second temperature range, and the second temperature threshold is greater than the highest temperature of the second temperature range.

In one example, the temperature adjustment component has different temperature adjustment intensity levels, and different temperature adjustment intensity levels correspond to different temperature adjustment intensities. The control module 302 generates the temperature adjustment instruction in the following manner: when it is determined that the fitted temperature is not within the set temperature range, based on a temperature magnitude that the fitted temperature is beyond a set temperature range, determining a temperature adjustment intensity level corresponding to the temperature magnitude beyond the set temperature range.

The control module is configured to control, according to the temperature adjustment instruction, the temperature adjustment component in the wireless charging transmitter to adjust temperature in the following manner: controlling the temperature adjustment component to adjust temperatures according to the determined temperature adjustment intensity level.

Regarding the apparatus in the foregoing example, the specific manner in which each module performs operation has been described in detail in the example of the method, and detailed description will not be given here.

Figure 13:
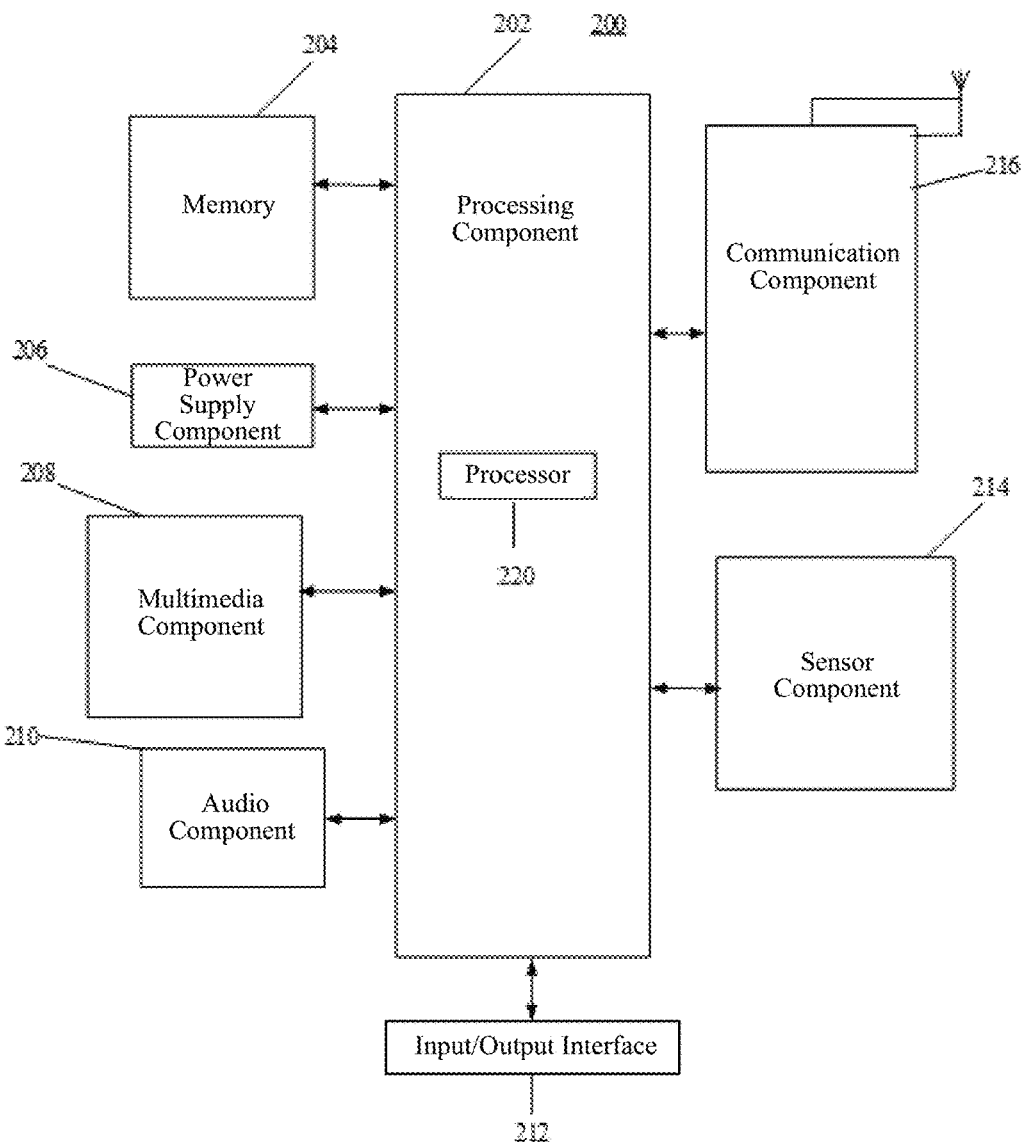
FIG. 13 is a block diagram showing a device 200 for controlling wireless charging according to an example of the present disclosure.

FIG. 13 is a block diagram showing a device 200 for controlling wireless charging according to an example of the present disclosure. For example, the device 200 may be a mobile phone, a computer, a digital broadcasting terminal, a messaging device, a game console, a tablet device, a medical device, a fitness device, a personal digital assistant, etc.

Referring to FIG. 13, the device 200 may include one or more of the following components: a processing component 202, a memory 204, a power supply component 206, a multimedia component 208, an audio component 210, an input/output (I/O) interface 212, a sensor component 214, and a communication component 216.

The processing component 202 generally controls the overall operations of the device 200, such as operations associated with displaying, telephone calls, data communication, camera operations, and recording operations. The processing component 202 may include one or more processors 220 to execute instructions to complete all or part of the steps in the above method. In addition, the processing component 202 may include one or more modules to facilitate interaction between the processing component 202 and other components. For example, the processing component 202 may include a multimedia module to facilitate interaction between the multimedia component 208 and the processing component 202.

The memory 204 is configured to store various types of data to support operations at the device 200. Examples of these data include instructions for any application or method operating on the device 200, contact data, phone book data, messages, pictures, videos, and so on. The memory 204 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 206 provides power to various components of the device 200. The power supply component 206 may include a power supply management system, one or more power supplies, and other components associated with generating, managing, and distributing power for the device 200.

The multimedia component 208 includes a screen that provides an output interface between the device 200 and the user. In some examples, the screen may include a liquid crystal display (LCD) and a touch panel (TP). If the screen includes a touch panel, then the screen may be implemented as a touch screen to receive input signals from the user. The touch panel includes one or more touch sensors, to sense touching, swiping, and gestures on the touch panel. The touch sensor may not only sense a boundary of the touching operation or swiping operation, but also detect a duration and pressure related to the touching operation or swiping operation. In some examples, the multimedia component 208 includes a front camera and/or a rear camera. When the device 200 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 210 is configured to output and/or input audio signals. For example, the audio component 210 includes a microphone (MIC). When the device 200 is in an operation mode, such as a call mode, a recording mode, and a voice recognition mode, the microphone is configured to receive an external audio signal. The received audio signal may be further stored in the memory 204 or transmitted via the communication component 216. In some examples, the audio component 210 further includes a speaker for outputting audio signals.

The I/O interface 212 provides an interface between the processing component 202 and a peripheral interface module. The peripheral interface module may be a keyboard, a click wheel, a button and so on. These buttons may include, but are not limited to: home button, volume button, start button, and lock button.

The sensor assembly 214 includes one or more sensors for providing the status assessment of various aspects for the device 200. For example, the sensor component 214 can detect the on/off state of the device 200, and the relative positioning of the components, for example, the component is a display and a keypad of the device 200, and the sensor component 214 can also detect the position change of the device 200 or a component of the device 2100, the presence or absence of user contact with the device 200, the orientation or acceleration/deceleration of the device 200, and the temperature change of the device 200. The sensor assembly 214 may include a proximity sensor configured to detect the presence of nearby objects without any physical contact. The sensor assembly 214 may also include a light sensor, such as a CMOS or CCD image sensor, for use in imaging applications. In some examples, the sensor assembly 214 may also include an acceleration sensor, a gyro sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination thereof. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 200 may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the receiving method described in any of the above examples.

In an example, there is also provided a non-transitory computer-readable storage medium including instructions, such as a memory 204 including instructions, which can be executed by the processor 220 of the device 200 to complete the above method. For example, the non-transitory computer-readable storage medium may be ROM, random access memory (RAM), CD-ROM, magnetic tape, floppy disk, optical data storage device, or the like.

The technical solution provided by the examples of the present disclosure may include the following beneficial effects: generating a temperature adjustment instruction based on the temperature of the wireless charging transmitter and the temperature of the charging terminal, and controlling the temperature adjustment component in the wireless charging transmitter to adjust the temperatures, so that the temperature of the wireless charging transmitter and the temperature of the charging terminal are within the set temperature range, which can ensure the safety of the terminal while ensuring the charging speed of the charging terminal during wireless charging, and improve the user's temperature experience when using the terminal.

It can be understood that in the present disclosure, "a plurality of" or "multiple" refer to two or more than two, and other quantifiers are similar. "And/or" describes the association relationship of the associated object, indicating that there can be three types of relationships, for example, A and/or B, which can mean: A alone exists, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the present disclosure, the first information may also be referred to as second information, and similarly, the second information may also be referred to as first information.

It can be further understood that, unless otherwise specified, "connected" includes a direct connection between the two without other components, and also includes an indirect connection between the two with other elements.

It can be further understood that although the operations in the examples of the present disclosure are described in a specific order in the drawings, they should not be understood as requiring these operations to be performed in the specific order shown or in a serial order, or requiring all the operations shown to be performed to get the desired result. In certain circumstances, multitasking and parallel processing may be advantageous.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Those skilled in the art will easily think of other examples of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the examples are to be regarded as exemplary only.

It should be understood that the present disclosure is not limited to the precise structure that has been described above and shown in the drawings, and various modifications and changes can be made without departing from its scope.

What is claimed is:

1. A wireless charging transmitter, comprising at least a first temperature collection component and a temperature adjustment component; wherein:
    the first temperature collection component includes a temperature sensor and is configured to collect a temperature of the wireless charging transmitter; and
    the temperature adjustment component is configured to adjust temperatures, according to a temperature adjustment instruction of a control component, so that a fitted temperature is within a set temperature range, wherein the fitted temperature is obtained by the control component based on the temperature of the wireless charging transmitter and a temperature of a charging terminal; the temperature adjustment instruction is generated by the control component based on the fitted temperature; the control component is arranged at the wireless charging transmitter or the charging terminal, and the charging terminal is a terminal that receives a charging signal transmitted by the wireless charging transmitter;
    wherein the temperature adjustment component comprises a heating component and a cooling component, the heating component comprises an electric heating resistance wire and is configured to heat in response to that the fitted temperature is lower than a minimum temperature of the set temperature range, and the cooling component comprises a fan device or liquid cooling and is configured to cool in response to that the fitted temperature is higher than a maximum temperature of the set temperature range;
    wherein the temperature adjustment instruction is generated by the control component based on an ambient temperature monitored by an ambient temperature monitoring component, and the ambient temperature monitoring component is arranged at the wireless charging transmitter or the charging terminal;
    wherein the heating component is further configured to heat during entire wireless charging process in response to that the ambient temperature is within a first temperature range, so that the fitted temperature is within the set temperature range; or to heat during a constant voltage charging phase of wireless charging in response to that the ambient temperature is within a second temperature range, so that the fitted temperature is within the set temperature range;
    wherein the cooling component is further configured to cool during a constant current charging phase of wireless charging in response to that the ambient temperature is within the second temperature range, so that the fitted temperature is within the set temperature range; or to cool during the entire wireless charging process in response to that the ambient temperature is within a third temperature range, so that the fitted temperature is within the set temperature range;
    wherein a highest temperature of the first temperature range is less than a first temperature threshold, and a lowest temperature of the third temperature range is higher than a second temperature threshold; and
    wherein the first temperature threshold is less than a lowest temperature of the second temperature range, and the second temperature threshold is greater than a highest temperature of the second temperature range.

2. A wireless charging control method, comprising:
    acquiring a temperature of a wireless charging transmitter and a temperature of a charging terminal;
    obtaining a fitted temperature based on the temperature of the wireless charging transmitter and the temperature of the charging terminal;
    generating a temperature adjustment instruction, in response to determining that the fitted temperature is not in a set temperature range; and
    according to the temperature adjustment instruction, controlling a temperature adjustment component in the wireless charging transmitter to adjust temperatures, so that the fitted temperature is within the set temperature range;
    wherein the temperature adjustment component comprises a heating component and a cooling component, the heating component comprises an electric heating resistance wire, and the cooling component comprises a fan device or liquid cooling, said according to the temperature adjustment instruction, controlling the temperature adjustment component in the wireless charging transmitter to adjust temperatures comprises one or more of:
        in response to that the fitted temperature is higher than a maximum temperature of the set temperature range, controlling the cooling component to cool; and
        in response to that the fitted temperature is lower than a minimum temperature of the set temperature range, controlling the heating component to heat;
    wherein the method further comprises:
    acquiring an ambient temperature monitored by an ambient temperature monitoring component; and further comprising one or more of:

in response to that the ambient temperature is within a first temperature range, controlling the heating component to heat during entire wireless charging process, so that the fitted temperature is within the set temperature range;

in response to that the ambient temperature is within a second temperature range, controlling the cooling component to cool during a constant current charging phase of wireless charging, and controlling the heating component to heat during a constant voltage charging phase of wireless charging, so that the fitted temperature is within the set temperature range; and in response to that the ambient temperature is within a third temperature range, controlling the cooling component to cool during the entire wireless charging process, so that the fitted temperature is within the set temperature range;

wherein a highest temperature of the first temperature range is less than a first temperature threshold, and a lowest temperature of the third temperature range is higher than a second temperature threshold; and wherein the first temperature threshold is less than a lowest temperature of the second temperature range, and the second temperature threshold is greater than a highest temperature of the second temperature range.

3. The wireless charging control method according to claim 2, wherein,
in the case that the temperature of the wireless charging transmitter and/or the temperature of the charging terminal are collected by a plurality of temperature sensors, acquiring the fitted temperature based on the temperature of the wireless charging transmitter and the temperature of the charging terminal comprises:
determining temperatures collected by respective ones of the plurality of temperature sensors and weighting coefficients corresponding to the plurality of temperature sensors; and
based on the temperatures collected by respective temperature sensors and corresponding weighting coefficients, fitting the temperatures collected by respective temperature sensors to obtain the fitted temperature.

4. The wireless charging control method according to claim 2, wherein:
the temperature adjustment component has different temperature adjustment intensity levels, and the different temperature adjustment intensity levels correspond to different temperature adjustment intensities, and
in response to determining that the fitted temperature is not in the set temperature range, generating the temperature adjustment instruction further comprises:
based on a temperature magnitude that the fitted temperature is beyond the set temperature range, determining a temperature adjustment intensity level corresponding to the temperature magnitude beyond the set temperature range; and
according to the temperature adjustment instruction, controlling the temperature adjustment component in the wireless charging transmitter to adjust temperatures further comprises:
controlling the temperature adjustment component to adjust temperatures according to the determined corresponding temperature adjustment intensity level.

5. A wireless charging control apparatus, comprising:
a processor; and
a memory for storing instructions executable by the processor;
wherein, the processor is configured to:
acquire a temperature of a wireless charging transmitter and a temperature of a charging terminal;
obtaining a fitted temperature based on the temperature of the wireless charging transmitter and the temperature of the charging terminal;
generating a temperature adjustment instruction, in response to determining that the fitted temperature is not in a set temperature range; and
according to the temperature adjustment instruction, control a temperature adjustment component in the wireless charging transmitter to adjust temperatures, so that the fitted temperature is within the set temperature range;
wherein the temperature adjustment component comprises a heating component and a cooling component, the heating component comprises an electric heating resistance wire, and the cooling component comprises a fan device or liquid cooling, and the processor is configured to:
in response to that the fitted temperature is higher than a maximum temperature of the set temperature range, control the cooling component to cool; and
in response to that the fitted temperature is lower than a minimum temperature of the set temperature range, control the heating component to heat;
wherein the processor is further configured to:
acquire an ambient temperature monitored by an ambient temperature monitoring component;
in response to that the ambient temperature is within a first temperature range, control the heating component to heat during entire wireless charging process, so that the fitted temperature is within the set temperature range;
in response to that the ambient temperature is within a second temperature range, control the cooling component to cool during a constant current charging phase of wireless charging, and control the heating component to heat during a constant voltage charging phase of wireless charging, so that the fitted temperature is within the set temperature range; and
in response to that the ambient temperature is within a third temperature range, control the cooling component to cool during the entire wireless charging process, so that the fitted temperature is within the set temperature range; and
wherein a highest temperature of the first temperature range is less than a first temperature threshold, and a lowest temperature of the third temperature range is higher than a second temperature threshold; and
wherein the first temperature threshold is less than a lowest temperature of the second temperature range, and the second temperature threshold is greater than a highest temperature of the second temperature range.

6. The wireless charging control apparatus according to claim 5, wherein in the case that the temperature of the wireless charging transmitter and/or the temperature of the charging terminal are collected by a plurality of temperature sensors, the processor is configured to:
determine temperatures collected by respective ones of the plurality of temperature sensors and weighting coefficients corresponding to the plurality of temperature sensors; and
based on the temperatures collected by respective temperature sensors and corresponding weighting coefficients, fit the temperatures collected by respective temperature sensors to obtain the fitted temperature.

7. The wireless charging control apparatus according to claim 5, wherein:

the temperature adjustment component has different temperature adjustment intensity levels, and the different temperature adjustment intensity levels correspond to different temperature adjustment intensities, and the processor is further configured to:
   based on a temperature magnitude that the fitted temperature is beyond the set temperature range, determine a temperature adjustment intensity level corresponding to the temperature magnitude beyond the set temperature range; and
   control the temperature adjustment component to adjust temperatures according to the determined corresponding temperature adjustment intensity level.

8. A non-transitory computer-readable storage medium, wherein when the instructions in the storage medium are executed by a processor, steps of a wireless charging control method are implemented, wherein the wireless charging control method comprises:

acquiring a temperature of a wireless charging transmitter and a temperature of a charging terminal;

obtaining a fitted temperature based on the temperature of the wireless charging transmitter and the temperature of the charging terminal;

generating a temperature adjustment instruction, in response to determining that the fitted temperature is not in a set temperature range; and according to the temperature adjustment instruction, controlling a temperature adjustment component in the wireless charging transmitter to adjust temperatures, so that the fitted temperature of the wireless charging transmitter and the temperature of the charging terminal are within the set temperature range;

wherein the temperature adjustment component comprises a heating component and a cooling component, the heating component comprises an electric heating resistance wire, and the cooling component comprises a fan device or liquid cooling, said according to the temperature adjustment instruction, controlling the temperature adjustment component in the wireless charging transmitter to adjust temperatures comprises one or more of:

in response to that the fitted temperature is higher than a maximum temperature of the set temperature range, controlling the cooling component to cool; and in response to that the fitted temperature is lower than a minimum temperature of the set temperature range, controlling the heating component to heat;

wherein the wireless charging control method further comprises:

acquiring an ambient temperature monitored by an ambient temperature monitoring component; and further comprising one or more of:

in response to that the ambient temperature is within a first temperature range, controlling the heating component to heat during entire wireless charging process, so that the fitted temperature is within the set temperature range;

in response to that the ambient temperature is within a second temperature range, controlling the cooling component to cool during a constant current charging phase of wireless charging, and controlling the heating component to heat during a constant voltage charging phase of wireless charging, so that the fitted temperature is within the set temperature range; and in response to that the ambient temperature is within a third temperature range, controlling the cooling component to cool during the entire wireless charging process, so that the fitted temperature is within the set temperature range;

wherein a highest temperature of the first temperature range is less than a first temperature threshold, and a lowest temperature of the third temperature range is higher than a second temperature threshold; and wherein the first temperature threshold is less than a lowest temperature of the second temperature range, and the second temperature threshold is greater than a highest temperature of the second temperature range.

* * * * *